United States Patent
Dandekar et al.

(10) Patent No.: US 10,771,338 B2
(45) Date of Patent: *Sep. 8, 2020

(54) TOPOLOGY DISCOVERY AND MANAGEMENT AND SON ORCHESTRATION

(71) Applicant: Corning Optical Communications LLC, Hickory, NC (US)

(72) Inventors: Yashodhan A. Dandekar, Cupertino, CA (US); Brian Dunn, Menlo Park, CA (US); Cong Shen, New York, NY (US); Peter J Worters, San Carlos, CA (US)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/201,112

(22) Filed: Nov. 27, 2018

(65) Prior Publication Data

US 2019/0097891 A1    Mar. 28, 2019

Related U.S. Application Data

(63) Continuation of application No. 15/069,781, filed on Mar. 14, 2016, now Pat. No. 10,148,510, which is a (Continued)

(51) Int. Cl.
*H04L 12/24* (2006.01)
*H04W 24/02* (2009.01)
(Continued)

(52) U.S. Cl.
CPC ...... *H04L 41/0893* (2013.01); *H04L 41/0886* (2013.01); *H04L 41/12* (2013.01); (Continued)

(58) Field of Classification Search
CPC . H04L 41/0893; H04L 41/0886; H04L 41/12; H04L 41/0816; H04W 24/02; H04W 28/08; H04W 40/32; H04W 84/18
See application file for complete search history.

(56) References Cited

U.S. PATENT DOCUMENTS 8,982,841 B2    3/2015   Srinivasan
2005/0207408 A1   9/2005   Elliott
(Continued)

OTHER PUBLICATIONS

EP16762711.6 Partial Search Report Completed Oct. 2, 2018, European Patent Office, 7 pgs.
(Continued)

*Primary Examiner* — Peter P Chau
(74) *Attorney, Agent, or Firm* — C. Keith Montgomery

(57) ABSTRACT

Systems and methods are disclosed for managing an aggregated self-organizing network (A-SON). In such, a plurality of small cells is grouped into clusters using available topology information. In one implementation, a subset of clusters is assigned to groups of a first type, such that the clusters within a group of the first type have minimal RF connectivity. For example, scanning or updating of RF parameters may then be coordinated such that adjacent clusters do not scan or update simultaneously but clusters within groups of the first type do have at least partially overlapping scans or updates. Similarly, subsets of clusters may be assigned to first and second groups of a second type, such that the clusters within a first group of the second type have sufficient coverage to provide RF connectivity to clusters within the second group, if the second group encounters a service interruption. Other benefits are also described.

16 Claims, 14 Drawing Sheets

Related U.S. Application Data continuation-in-part of application No. 15/059,235, filed on Mar. 2, 2016.

(60) Provisional application No. 62/132,102, filed on Mar. 12, 2015, provisional application No. 62/127,004, filed on Mar. 2, 2015.

(51) Int. Cl.
| | | |
|---|---|---|
| *H04W 84/18* | (2009.01) | |
| *H04W 28/08* | (2009.01) | |
| *H04W 40/32* | (2009.01) | |

(52) U.S. Cl.
CPC ......... *H04W 24/02* (2013.01); *H04L 41/0816* (2013.01); *H04W 28/08* (2013.01); *H04W 40/32* (2013.01); *H04W 84/18* (2013.01)

(56) References Cited

U.S. PATENT DOCUMENTS

| | | | |
|---|---|---|---|
| 2007/0291836 | A1 | 12/2007 | Shi et al. |
| 2009/0310584 | A1 | 12/2009 | Viorel et al. |
| 2010/0167730 | A1 | 7/2010 | Shin |
| 2010/0315974 | A1 | 12/2010 | Richardson et al. |
| 2011/0096714 | A1 | 4/2011 | French et al. |
| 2011/0244866 | A1 | 10/2011 | Yamamoto et al. |
| 2012/0071168 | A1 | 3/2012 | Tomici et al. |
| 2012/0134294 | A1* | 5/2012 | Puthenpura ............ H04W 16/18 370/254 |
| 2012/0140627 | A1* | 6/2012 | Puthenpura ............ H04L 41/145 370/235 |
| 2012/0142360 | A1* | 6/2012 | Puthenpura ............ H04L 41/145 455/446 |
| 2012/0208579 | A1 | 8/2012 | Persson et al. |
| 2013/0018978 | A1 | 1/2013 | Crowe et al. |
| 2013/0143541 | A1 | 6/2013 | Henderson et al. |
| 2013/0210436 | A1 | 8/2013 | Srinivasan et al. |
| 2013/0272132 | A1 | 10/2013 | Heo et al. |
| 2013/0294403 | A1 | 11/2013 | Srinivasan |
| 2013/0310095 | A1* | 11/2013 | El-Najjar ............ H04W 24/04 455/507 |
| 2013/0337832 | A1 | 12/2013 | Park et al. |
| 2014/0036816 | A1 | 2/2014 | Madan et al. |
| 2014/0050086 | A1 | 2/2014 | Himayat et al. |
| 2014/0092730 | A1 | 4/2014 | Yang |
| 2014/0095325 | A1 | 4/2014 | Kim et al. |
| 2014/0269502 | A1 | 9/2014 | Forenza et al. |
| 2014/0376374 | A1 | 12/2014 | Moser et al. |
| 2015/0031354 | A1 | 1/2015 | Nuss et al. |
| 2015/0043390 | A1 | 2/2015 | Wang et al. |
| 2015/0173011 | A1 | 6/2015 | Das et al. |
| 2015/0257051 | A1 | 9/2015 | Rao et al. |
| 2015/0295807 | A1 | 10/2015 | Huang et al. |
| 2016/0062758 | A1 | 3/2016 | Narayanan et al. |
| 2016/0095012 | A1 | 3/2016 | Laukkanen |
| 2016/0112945 | A1 | 4/2016 | Chen et al. |
| 2016/0262038 | A1 | 9/2016 | Dunn et al. |
| 2016/0262063 | A1 | 9/2016 | Chen et al. |
| 2016/0262069 | A1 | 9/2016 | Parsay et al. |
| 2016/0269954 | A1 | 9/2016 | Purohit |
| 2017/0311217 | A1 | 10/2017 | Jung et al. |

OTHER PUBLICATIONS

International Preliminary Report on Patentability for PCT/US2016/022372, dated Sep. 21, 2017, 10 pages.
International Search Report and Written Opinion for PCT/US2016/022372, dated Aug. 30, 2016, 13 pages.
Non-Final Office Action for U.S. Appl. No. 15/059,235, dated Oct. 19, 2017, 18 pages.
Final Office Action for U.S. Appl. No. 15/059,235, dated Mar. 21, 2018, 20 pages.
Advisory Action for U.S. Appl. No. 15/059,235, dated May 30, 2018, 3 pages.
Examiner's Answer to the Appeal Brief for U.S. Appl. No. 15/059,235, dated Dec. 10, 2018, 13 pages.
Non-Final Office Action for U.S. Appl. No. 15/069,781, dated Feb. 14, 2018, 28 pages.
Notice of Allowance and Examiner-Initiated Interview Summary for U.S. Appl. No. 15/069,781, dated Aug. 2, 2018, 9 pages.
Non-Final Office Action for U.S. Appl. No. 15/081,311, dated Mar. 8, 2018, 17 pages.
Final Office Action for U.S. Appl. No. 15/081,311, dated Sep. 20, 2018, 7 pages.
Advisory Action for U.S. Appl. No. 15/081,311, dated Jan. 18, 2019, 3 pages.
Advisory Action for U.S. Appl. No. 15/081,311, dated Feb. 8, 2019, 3 pages.
Non-Final Office Action for U.S. Appl. No. 15/069,220, dated Dec. 15, 2017, 16 pages.
Notice of Allowance for U.S. Appl. No. 15/069,220, dated Jul. 12, 2018, 8 pages.
Partial Supplementary European Search Report for European Patent Application No. 16762711.6, dated Oct. 11, 2018, 9 pages.
Decision on Appeal for U.S. Appl. No. 15/059,235, dated Jun. 4, 2020, 9 pages.
Notice of Allowance for U.S. Appl. No. 16/176,317, dated Apr. 7, 2020, 10 pages.

\* cited by examiner

TOPOLOGY DISCOVERY AND MANAGEMENT AND SON ORCHESTRATION

CROSS-REFERENCE TO RELATED APPLICATIONS

This application is a continuation of U.S. application Ser. No. 15/069,781, filed Mar. 14, 2016, which is a continuation-in-part of U.S. application Ser. No. 15/059,235, filed Mar. 2, 2016, which claims priority to U.S. Provisional Application 62/127,004 filed on Mar. 2, 2015. U.S. application Ser. No. 15/069,781 also claims priority to U.S. Provisional Application No. 62/132,102, filed Mar. 12, 2015. All aforementioned applications are incorporated by reference herein in their entireties.

FIELD

This application is in the field of topology discovery in wireless networks.

BACKGROUND

Operators of mobile systems, such as Universal Mobile Telecommunications Systems (UMTS) and its offspring including LTE (Long Term Evolution) and LTE-Advanced, are increasingly relying on wireless small cell radio access networks (RANs) in order to deploy indoor (as well as dense outdoor) voice and data services to enterprises and other customers. Such small cell RANs typically utilize multiple-access technologies capable of supporting communications with multiple users using radio frequency (RF) signals and sharing available system resources such as bandwidth and transmit power.

One type of RAN architecture that is currently deployed includes a network of radio nodes connected to a centralized access controller or aggregation node. One example of such a controller or node is the Services Node available from Spidercloud Wireless Inc. of San Jose, Calif. The centralized Services Node provides a number of advantages that help meet stringent key performance indicator (KPI) requirements. It also has dedicated hardware that is used to provide frequency synchronization between radio nodes in order to facilitate UMTS and LTE airlink performance.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Certain implementations of systems and methods according to present principles improve upon prior systems in various ways. In particular, systems and methods according to present principles address problems of building topology information for the boundary cells of clusters of small cells, which see not only overlay macro cells but also boundary cells of other clusters that are deployed in their proximity. Other problems addressed by current systems and methods include updating of network topology when some cells change their configurable parameters and coordination of the selection of unlicensed channels to avoid interference with neighboring clusters. Other benefits will also be understood.

In one aspect, the invention is directed towards a method of managing an aggregated self-organizing network (A-SON), including: grouping a plurality of small cells into clusters using available topology information; assigning a subset of clusters to groups of a first type, such that the clusters within a group of the first type have minimal RF connectivity; and coordinating scanning or updating of RF parameters such that adjacent clusters do not scan or update simultaneously but clusters within groups of the first type do have at least partially overlapping scans or updates.

Implementations of the invention may include one or more of the following. The grouping a plurality of small cells into clusters may include performing radio environment measurements scan to obtain data including signal strength, bandwidth, and either PSC cell identity or PCI. The method may further include, in an LTE system, employing an automatic neighbor relations function to identify and collect data about neighboring cells to set up a neighbor relation table, whereby cell handovers may be facilitated in a more rapid fashion. The coordinating may include using a conflict graph. The method may further include detecting a change in a parameter in a cell of one of the clusters, and propagating the changed parameter to neighboring cells within the one cluster and to neighbor cells of the cell in different clusters. The method may further include: at a small cell, detecting a change in a parameter in an overlay macro cell of one of the clusters; determining if any other small cells in the network have the macro cell in their topology; and for other small cells that have the macro cell in their topology, updating the small cell parameters with at least the changed parameter. The updating the small cell parameters may include updating the topology information of the small cell.

The method may further include determining if the updating of the small cell parameters adversely impacts system optimization for a given cell, and if so, then suppressing the updating for the given small cell. The method may further include performing a system-wide configuration change, including performing the system wide configuration change sequentially, where the change is performed on one SON group cluster of the first type at a time. Following the grouping, the method may further include: receiving a join request from a RN and/or a RAN; authenticating, with a cluster manager included in the gateway, the RN and/or RAN that sends the join request; and assigning the RN and/or RAN to a cluster.

The method may further include using a distributed SON (D-SON) module for provisioning RNs assigned to the cluster in accordance with self-configuration, self-optimization and self-healing (SON) functionality. The method may further include, coordinating, with an aggregated SON (A-SON) module, activity performed by each of the D-SON modules. The method may further include assigning, with a cluster manager operating in coordination with the A-SON module, a newly added RN to one of the RANs. The coordinating the activity performed by each of the D-SON modules may include determining that two or more selected ones of the D-SON modules can conduct SON functionality simultaneously with one another.

The topology information may include at least one of GPS coordinates, physical address, IP address, and RF topology, and the topology information may be determined through Radio Environment Monitoring (REM). Minimal RF conductivity may correspond to where a UE at the edge of one radio node cannot detect the second radio node. A maximum path loss at which downlink channels are reliably detected may be denoted by D_max, and the minimal RF conductivity may correspond to D_max+dB.

In another aspect, the invention is directed towards a method of managing an aggregated self-organizing network (A-SON), including: grouping a plurality of small cells into clusters using available topology information; assigning a subset of clusters to first and second groups of a second type, such that the clusters within a first group of the second type have sufficient coverage to provide RF connectivity to clusters within the second group, if the second group encounters a service interruption.

In yet another aspect, the invention is directed towards a method of managing an aggregated self-organizing network (A-SON), then network operating at least partially with unlicensed spectrum, including: grouping a plurality of small cells into clusters using available topology information; causing a plurality of radio nodes associated with respective small cells to select a plurality of respective unlicensed carrier channels for their operation in addition to licensed carrier channels; and coordinating the selection of the unlicensed carrier channels to ensure that boundary small cells in neighboring clusters do not use the same channel.

Implementations of the invention may include one or more of the following. The method may further include coordinating the selection to ensure that directly neighboring clusters do not use the same channel. The method may further include coordinating the selection to ensure that the clusters do not use channels associated with Wi-Fi.

In yet another aspect, the invention is directed towards a gateway through which a plurality of RANs communicate with a packet core network, including: a plurality of access controller modules to which at least one RAN is assigned, each of the access controller modules being configured to control the respective RAN assigned thereto; a core network aggregator module configured as single interface for all communication between the plurality of access controller modules and the packet core network; and a cluster manager module for assigning RNs to the access controller modules and transferring RN assignments from one access controller module to a different access controller module under specified circumstances.

Implementations of the invention may include one or more of the following. The cluster manager module may be further configured to: assign a subset of clusters to groups of a first type, such that the clusters within a group of the first type have minimal RF connectivity; and coordinate scanning or updating of RF parameters such that adjacent clusters do not scan or update simultaneously but clusters within groups of the first type do have at least partially overlapping scans or updates. The cluster manager module may be further configured to: assign a subset of clusters to first and second groups of a second type, such that the clusters within a first group of the second type have sufficient coverage to provide RF connectivity to clusters within the second group, if the second group encounters a service interruption.

The cluster manager module may be further configured to: cause a plurality of radio nodes associated with respective small cells to select a plurality of respective unlicensed carrier channels for their operation in addition to licensed carrier channels; coordinate the selection of the unlicensed carrier channels to ensure that boundary small cells in neighboring clusters do not use the same channel.

In another aspect, the invention is directed towards a method of managing an aggregated self-organizing network (A-SON), including: performing radio environment measurements to obtain data including signal strength, bandwidth, and either PSC cell identity or PCI; and grouping a plurality of small cells into clusters using available topology information determined from the performing measurements step.

In another aspect, the invention is directed towards a method of managing an aggregated self-organizing network (A-SON) in an LTE system, including: grouping a plurality of small cells into clusters using available topology information; and employing an automatic neighbor relations function to identify and collect data about neighboring cells to set up a neighbor relation table, whereby cell handovers may be facilitated in a more rapid fashion.

In another aspect, the invention is directed towards a method of managing an aggregated self-organizing network (A-SON), including: grouping a plurality of small cells into clusters using available topology information; and detecting a change in a parameter in a cell of one of the clusters, and propagating the changed parameter to neighboring cells within the one cluster and to neighbor cells of the cell in different clusters.

In another aspect, the invention is directed towards a method of managing an aggregated self-organizing network (A-SON), including: grouping a plurality of small cells into clusters using available topology information; at a small cell, detecting a change in a parameter in an overlay macro cell of one of the clusters; determining if any other small cells in the network have the macro cell in their topology; and for other small cells that have the macro cell in their topology, updating the small cell parameters with at least the changed parameter.

In yet other aspects, the invention is directed towards a non-transitory computer readable medium, comprising instructions for causing a computing environment to perform any of the above-noted methods.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Like reference numerals refer to like elements throughout. Elements are not to scale unless otherwise noted.

DETAILED DESCRIPTION

Overview

A centralized access controller or aggregation node may be implemented as an enterprise premise-based controller element that coordinates a group of radio nodes (RNs). In an LTE embodiment, the access controller functions as a local, premise-based gateway that anchors and aggregates a group of LTE RNs. As previously mentioned, one particular example of such an access controller is the Spidercloud Services Node. Details concerning the Spidercloud Services Node may be found in U.S. Pat. No. 8,982,841, which is hereby incorporated by reference in its entirety.

The use of the Spidercloud Services Node achieves a number of advantages. For instance, by presenting a services node and an entire group of RNs controlled by the SN as a single virtual or evolved Node B (eNB) to the core network, the complexity associated with aggregating and controlling a large number of RNs (performed by the services node) is hidden from the Evolved Packet Core (EPC). Hiding such complexity is particularly important as the number of small cells is likely to significantly exceed the number of LTE macro cellular eNB's, which drives the dimensioning of EPC equipment pools. Second, mobility between the individual RNs controlled by an SN is completely handled at a local enterprise gateway level, thus significantly reducing mobility-related signaling from impacting the MME pool in the EPC.

While the advantages of having a centralized access controller or aggregation node such as the Spidercloud Services Node have proven to be important, it is generally only well-suited for certain types of deployment. At the low end of the pyramid, deployments that require only a handful of radio nodes do not justify the additional cost incurred by installing a services node in the enterprise. At the high end of the pyramid, deployments that require thousands of radio nodes cannot be serviced because of scaling limitations in the current E-RAN software. However, as the number of small cells increases exponentially in the future, it may be advantageous to provide a scalable solution to deploy and manage those small cell systems with reduced capital and operating expenses.

To address this problem, an E-RAN gateway architecture is shown herein which can be scaled to support all sizes of deployments, either within the enterprise, inside the operator's network, or in the cloud.

Moreover, virtualization is seen as an important trend in the telecommunications industry with large mobile operators committing to transform network functions running on dedicated and proprietary hardware to commercial off the shelf equipment running virtualized network functions. Accordingly, in some implementations the gateway architecture described herein may reside on a virtual machine platform, thus eliminating the need for specialized hardware.

Operating Environment

Figure 1:
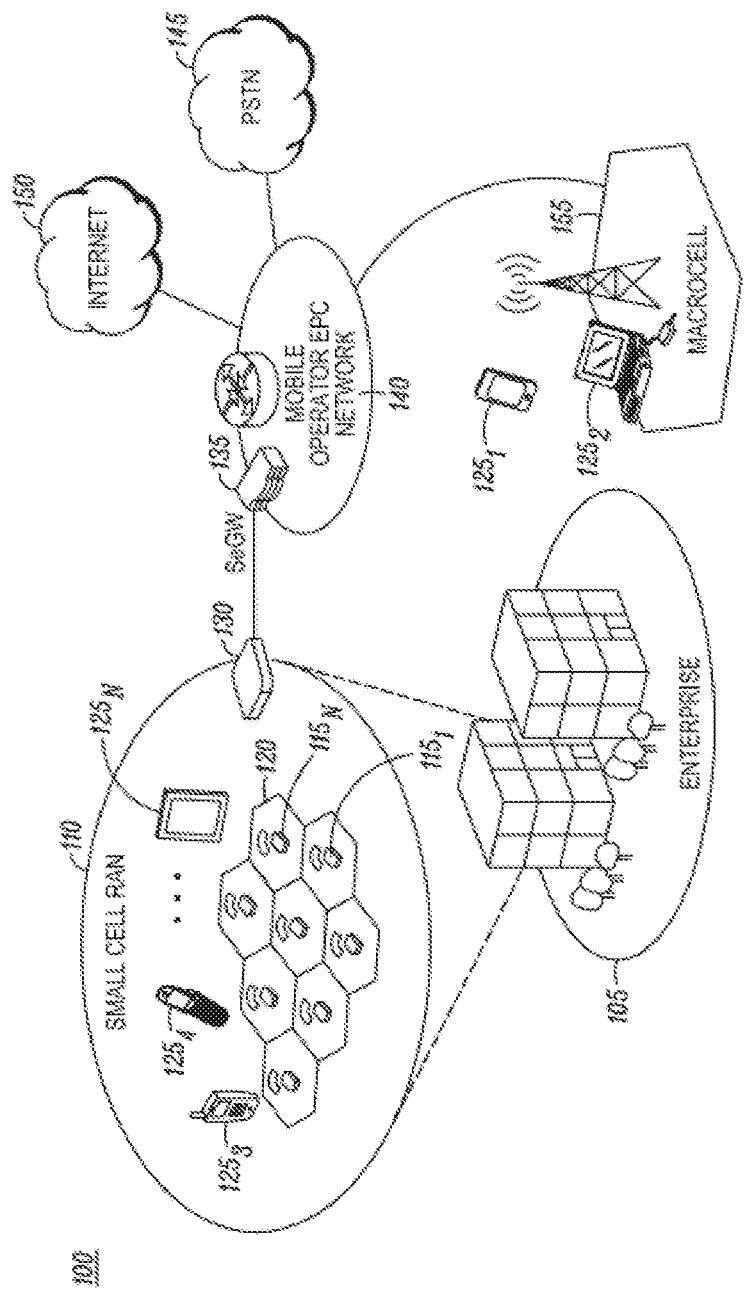
FIG. 1 shows a known mobile telecommunications environment that includes an enterprise in which a small cell RAN is implemented.

FIG. 1 shows a known mobile telecommunications environment 100 that includes an enterprise 105 in which a small cell RAN 110 is implemented. The small cell RAN 110 includes a plurality of radio nodes (RNs) 1151 . . . 115N. Each radio node 115 has a radio coverage area (graphically depicted in the drawings as hexagonal in shape) that is commonly termed a small cell. A small cell may also be referred to as a femtocell, or using terminology defined by 3GPP as a Home Evolved Node B (HeNB). In the description that follows, the term "cell" typically means the combination of a radio node and its radio coverage area unless otherwise indicated. A representative cell is indicated by reference numeral 120 in FIG. 1.

The size of the enterprise 105 and the number of cells deployed in the small cell RAN 110 may vary. In typical implementations, the enterprise 105 can be from 50,000 to 500,000 square feet and encompass multiple floors and the small cell RAN 110 may support hundreds to thousands of users using mobile communication platforms such as mobile phones, smartphones, tablet computing devices, and the like (referred to as "user equipment" (UE) and indicated by reference numerals 1251-125N in FIG. 1).

The small cell RAN 110 includes an access controller 130 that manages and controls the radio nodes 115. The radio nodes 115 are coupled to the access controller 130 over a direct or local area network (LAN) connection (not shown in FIG. 1) typically using secure IPsec tunnels. The access controller 130 aggregates voice and data traffic from the radio nodes 115 and provides connectivity over an IPsec tunnel to a security gateway SeGW 135 in an Evolved Packet Core (EPC) 140 network of a mobile operator. The EPC 140 is typically configured to communicate with a public switched telephone network (PSTN) 145 to carry circuit-switched traffic, as well as for communicating with an external packet-switched network such as the Internet 150.

The environment 100 also generally includes Evolved Node B (eNB) base stations, or "macrocells", as representatively indicated by reference numeral 155 in FIG. 1. The radio coverage area of the macrocell 155 is typically much larger than that of a small cell where the extent of coverage often depends on the base station configuration and surrounding geography. Thus, a given UE 125 may achieve connectivity to the network 140 through either a macrocell or small cell in the environment 100.

Figure 2:
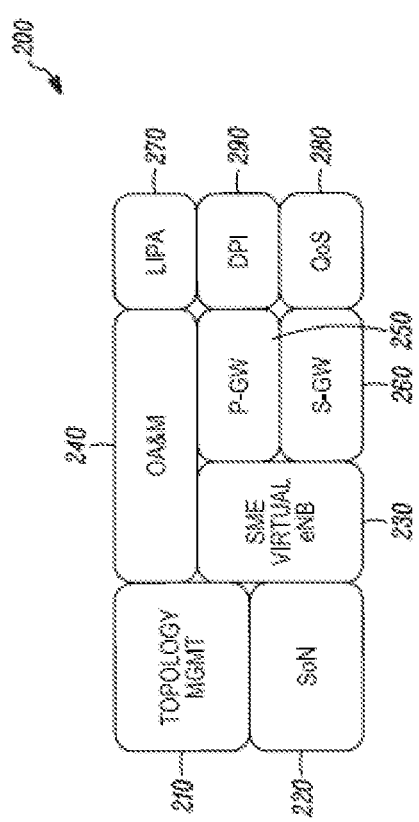
FIG. 2 shows a functional block diagram of one example of an access controller such as the Spidercloud Services Node.

As previously mentioned, the access controller shown above may be the Spidercloud Services Node, available from Spidercloud Wireless, Inc., of San Jose, Calif. FIG. 2 shows a functional block diagram of one example of an access controller 200 such as the Spidercloud services node. The access controller may include topology management 210, self-organizing network (SON) 220, a services node mobility entity (SME) 230, an operation, administration, and management (OAM) module 240, a PDN GW/PGW module 250, a SGW module 260, a local IP access (LIPA) module 270, a QoS module 280, and a deep packet inspection (DPI) module 290. Alternative embodiments may employ more or less functionality/modules as necessitated by the particular scenario and/or architectural requirements.

Cloud-Based Gateway

As mentioned above, an access controller is generally suitable for a small cell RAN 110 that includes anywhere from several (e.g., 8) cells 120 up to about 100 or so cells 120. RANs that include fewer than several cells 120 are typically too small to make the cost of the access controller economical. Likewise, RANs that include more than about 100 cells can be difficult to coordinate with a single access controller.

One way to address those environments in which the use of an access controller is impractical, either because it includes too few or too many cells, is to move the functionality of the access controller from the enterprise 105 to a cloud-based gateway that may be located, for example, in the mobile operator's core network. Alternatively, the cloud-based gateway may be located elsewhere and operated by a third party (e.g., an entity other than the mobile operator or the enterprise).

Figure 3:
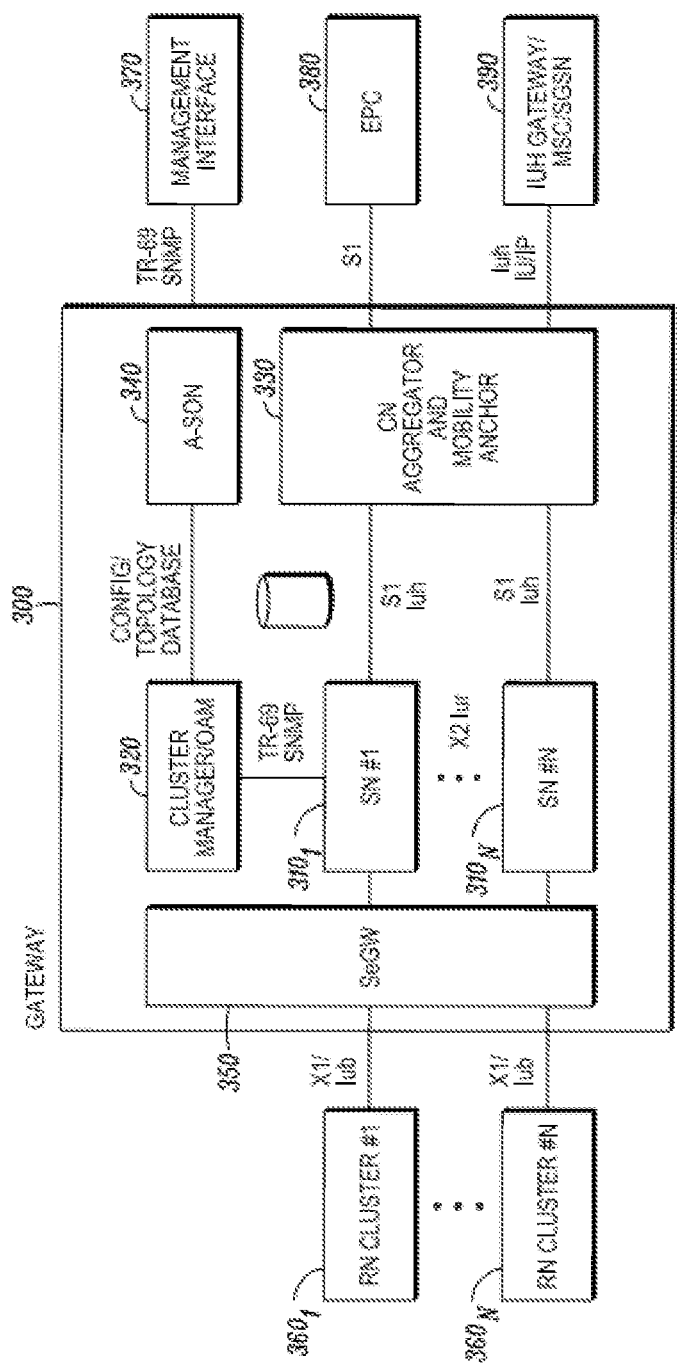
FIG. 3 shows a functional block diagram of one example of a gateway that operates between a series of RANs and a core networks.

FIG. 3 shows a functional block diagram of one example of a gateway 300 of the type described above. The gateway 300 includes multiple instances of a services node (SN) $310_1, 310_2 \ldots 310_n$ ("310"), cluster manager and operations/administration module (OAM) 320, an aggregated SON (A-SON) module 340 and a core network (CN) aggregator and mobility anchor 330. It should be appreciated that the gateway 300 shown in FIG. 3 is only one example of such a gateway and that it may have more or fewer components than shown, may combine two or more components, or it may have a different configuration or arrangement of components. In some implementations the components of the gateway 300 may be run as a virtual application residing on a virtual machine platform. In this way the software will be agnostic to the underlying hardware provided that a virtual machine layer lies between them. More generally, however, the various components shown in FIG. 3 may be implemented in hardware, software or a combination of both hardware and software. Additionally, in some cases the gateway 300 may also be practiced in distributed computing environments where certain tasks are performed by remote processing devices that are linked through a communications network.

If the components of the gateway 300 are run as a virtual application, then in some implementations the gateway 300 may employ a Network Function Virtualization (NFV) architecture. NFV refers to an architecture for telecommunication services as published by the European Telecommunications Standards Institute (ETSI) in a series of documents available from the ETSI website (See Network Functions Virtualization (NFV); Infrastructure Overview, ETSI GS NFV-INF 001 V1.1.1 (2015-01), http://www.etsi.org/deliver/etsi_gs/NFV-INF/001.sub.--099/001/01.01.01.su-b.--60/gs_NFV-INF001v010101p.pdf). NFV uses a generic hardware platform and software adapted for the generic hardware platform. Thus, NFV creates a network that can be more flexible and dynamic than a legacy communication network. In NFV-based networks, a Virtual Network Function (VNF) decouples the software implementation of the network function from the infrastructure resources it runs on by virtualization. A network service is based on one or more VNFs and/or Physical Network Functions (PNFs), their interconnections, and chaining definitions. The VNFs can be executed on a wide variety of generic hardware processing platforms (e.g., x86 based hardware). Therefore, VNFs may be installed, removed, and moved between hardware facilities much more easily, less costly and thus, more frequently.

Referring again to FIG. 3, each instance of the services node 310 provides the functionality of an access controller of the type described above and serves a single small cell RAN, which is shown as a radio node (RN) cluster. For example, as shown, $SN310_1$ serves RN cluster $360_1$ and $SN310_N$ serves RN cluster $360_N$, both via the optional security gateway 350. The RNs in the clusters may communicate with the security gateway 350 over a proprietary X1/Iub' connection. The SNs 310 may communicate with one another over conventional protocols using, for example, X2/Iur connections. The remaining gateway components shown in FIG. 3 allow the aggregation of the services nodes 310 and provide intra-small cell coordination such as UE handovers between the nodes and coordination of the D-SON functionality provided by each individual services node 310.

Thus, each instance of the SN310 acts as a serving controller to one or more RN clusters and each SN310 acts as a control point for all radio nodes in the radio node cluster. As the number of RN clusters increase, new instances of the SN310 can be created to meet the requirements. While in principle there is no limit on the number of SN instances that are allowed, in practice it will depend on constraints such as CPU, memory, networking interfaces and so on. Each SN is responsible for 3G and LTE Radio Resource Management (RRM) of all the RN clusters to which it is connected and admission control of RRC Connections. In addition, the SN is responsible for coordinating RF parameters using Localized SON (e.g., D-SON) and for coordinating mobility across RNs within or between clusters. Since the architecture of each SN supports centralized layer L3 (RRC/RRM) processing, it is able to provide a wide variety of features. For instance, each SN can provide centralized admission control that enables the SN to re-direct low priority users to other cells. In addition, each SN can provide fast handovers since they are completely hidden from the EPC. The SNs can also perform LTE RRC reestablishment procedures across cells and RANs and, furthermore, they can support soft handovers in UMTS. The SNs can also optimize LTE call setup times by combining and/or piggybacking multiple control plane messages between a radio node and a SN, which is required in high latency backhaul networks.

As previously mentioned, the SNs 310 may communicate with one another over conventional protocols using, for example, X2/Iur connections. Communication between the SNs 310 and the cluster manager/OAM 320 may also employ conventional protocols such as SNMP/TR-069. Likewise, the SNs 310 and the CN aggregator/mobility anchor 330 may employ conventional protocols such as Iuh (for UMTS) and S1 (for LTE over SCTP/IP). Of course, alternative protocols may be employed instead, including both standard and proprietary protocols.

Figure 4A:
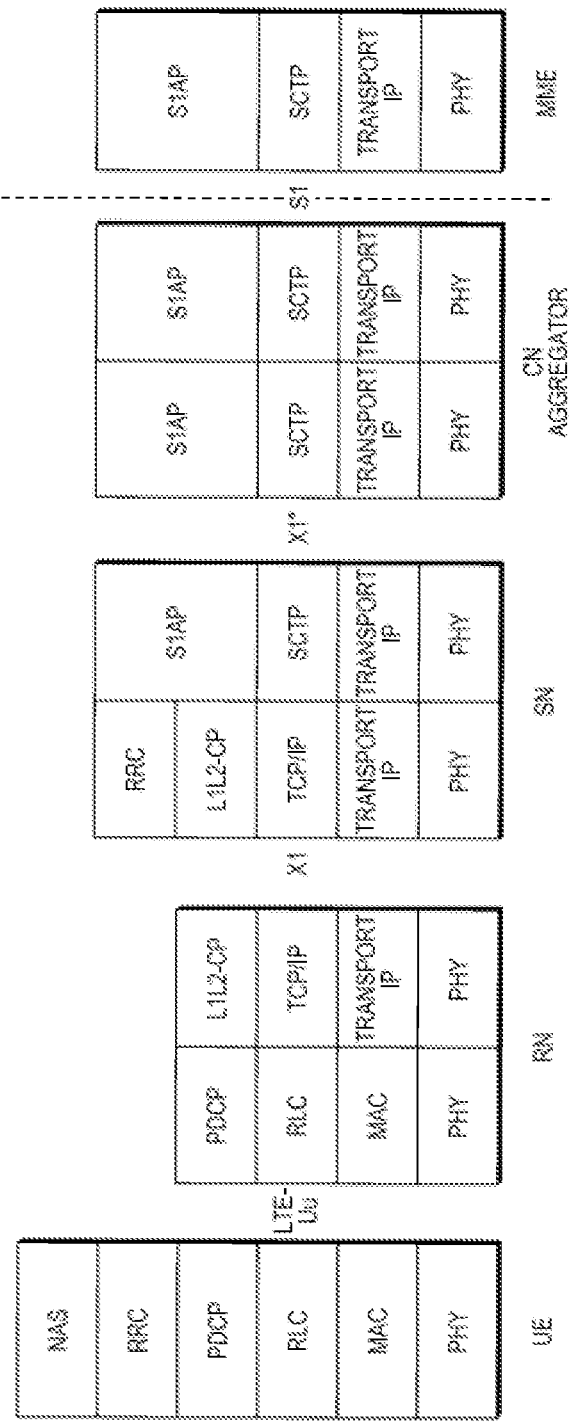
FIGS. 4A and 4B shows one example of a protocol stack that may be employed for the control plane and the user plane, respectively, in an environment that includes the gateway of FIG. 3 in terms of the OSI (Open Systems Interconnection) model of logical layers.
Figure 4B:
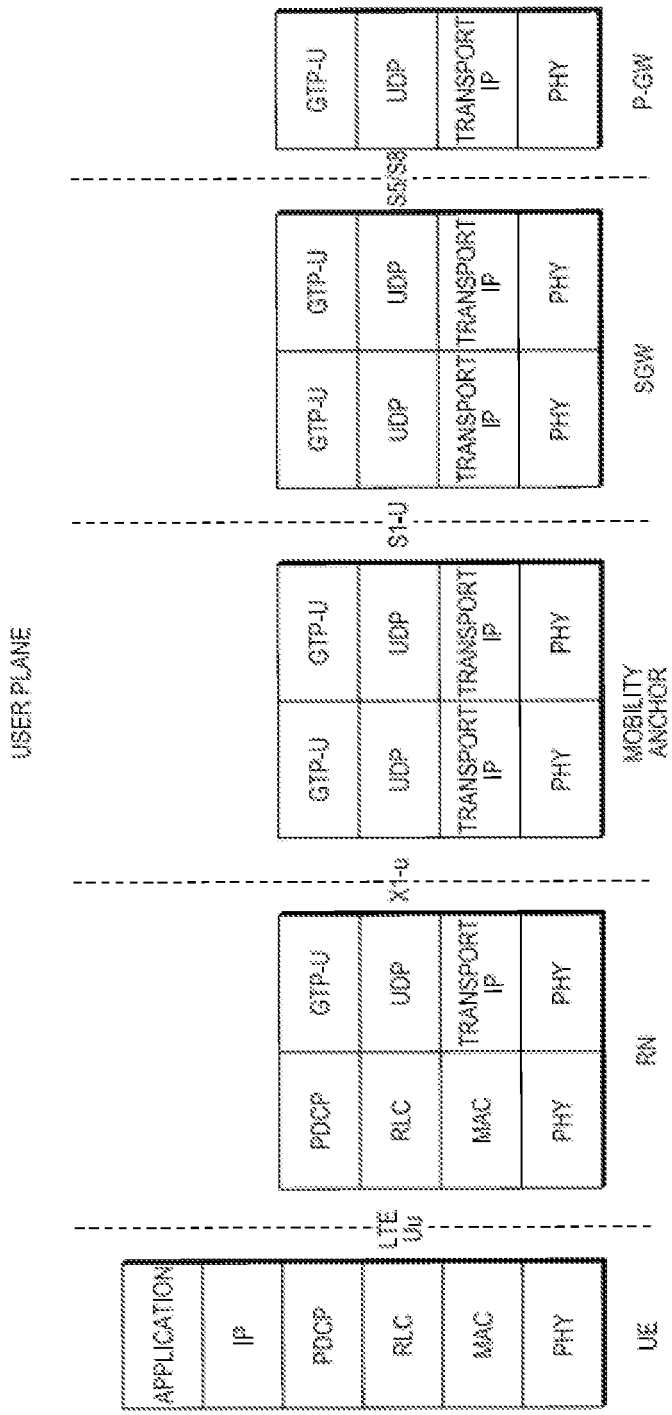

FIGS. 4A and 4B shows one example of a protocol stack that may be employed for the control plane and the user plane, respectively, in an environment that includes the gateway of FIG. 3 in terms of the OSI (Open Systems Interconnection) model of logical layers. As is known in the art, the Non-Access Stratum (NAS) layer protocol is responsible for signaling and traffic between UE and the network for control purposes such as network attach, authentication, setting up of bearers, and mobility management. The S1 Application Protocol Layer (S1AP) supports the various functions of the S1 interface. The Stream Control Transmission Protocol (SCTP) is a transport protocol for exchanging data that provides a reliable transport service over IP and operates at the equivalent level of UDP and TCP. The Radio Resource Control (RRC) protocol is responsible for control plane signaling between a UE and the network, i.e. such tasks as broadcast of system information; establishment, maintenance and release of RRC connection; establishment, configuration, maintenance and release of signaling and data radio bearers; security functions including key management;

mobility functions such as control of UE cell selection/ reselection; paging; UE measurement configuration, processing and reporting; handover; quality of service (QoS) management functions; UE measurement reporting and control of the reporting, but not exclusively. The Packet Data Control Protocol (PDCP) layer is responsible for (de-)compressing the headers of user plane IP packets. The Radio Link Control (RLC) layer is used to format and transport traffic and a Medium Access Control (MAC) layer provides addressing and channel access control mechanisms. The physical (PHY) layer, translates logical communication requests into hardware-specific operations such as modulation, bit synchronization, multiplexing, equalization, forward error correction etc.

Protocol layers that may be employed in the control plane between the mobility anchor and the RNs and between the mobility anchor and the SGW in the core network may include a Transport Internet Protocol (IP) layer, a user datagram protocol (UDP) and a GPRS Tunneling Protocol-User plane (GTP-U) for creating IP-based tunnels. It should be noted that the X1, X1" and X1-u interfaces shown in FIG. 4 may be proprietary. The remaining interfaces may all be standard 3GPP interfaces.

In some embodiments each of the SNs may perform logical open systems interconnection (OSI) layer L3 processing. In some cases the SNs may also perform at least a portion of logical OSI layer L2 processing such as Packet Data Control Protocol (PDCP) processing, for example.

The cluster manager and operations/administration module (OAM) 320 shown in FIG. 3 provides a single provisioning point for the RN clusters. Among other things, the Cluster Manager/OAM provides authentication of radio nodes/clusters, self-discovery/radio node join procedures, and software license management. The cluster manager/OAM module 320 also manages SN start-up and stop, redirects newly-joining radio nodes to a particular RN cluster and redirects RNs to a specific SN instance. These tasks can be performed using topology discovery information obtained by the A-SON module 340 and the session load on the SN. In the event of a hardware or software failure within the gateway 300, the cluster manager/OAM module 320 can redirect RN clusters to new SN instances. The cluster manager/OAM module 320 may communicate with the SNs using any of a variety of protocols such as the Broadband Forum Technical Report 069 (TR-69) protocol, the Simple Network Management Protocol (SNMP), and the like.

In one implementation, the self-discovery/radio node join procedure may proceed as follows. A radio node is pre-provisioned with the fully qualified domain name (FQDN) of the gateway 300. When an RN boots up, it performs a Domain Name System (DNS) resolution process to obtain the IP address of the gateway 300. The RN then sends a Join Request message to the gateway 300 requesting a software image download from the cluster manager/OAM module 320. The cluster manager/OAM module 320 authenticates the RN and sends a Join Accept message upon successful authentication. The Join Accept message contains the SN information that is going to serve this RN such as an identifier and IP address of the SN to which it is to connect and any necessary software needed to establish that connection. The cluster manager/OAM module 320 selects the SN instance that is to serve this particular RN based on a variety of factors ("signatures") that may include, without limitation, the geographic location of the RN (e.g., GPS coordinates, physical address, RF topology, IP address), the results of the topology discovery process performed by the A-SON module 340 and load balancing considerations based on the current load of the SNs.

The cluster manager/OAM module 320 can initiate the launch of a new SN instance when needed. For instance, in the event of an unrecoverable failure at a SN, the cluster manager/OAM module 320 can redirect a cluster to a different SN instance or launch a new SN instance. Based on the current load, the cluster manager/OAM module 320 can offload some of the SNs and change the cluster configuration. The cluster manager/OAM module 320 can also support additional features such as location locking. For example, an RN may be factory-provisioned so that it is only operable at a fixed location.

The core network (CN) aggregator and mobility anchor module 330 shown in FIG. 3 acts as the interface between the gateway 300 and the core network. The CN aggregator in the CN aggregator and mobility anchor module 330 takes the individual SN connections and combines them into a single connection that is directed to the Evolved Packet Core (EPC) 380 of the mobile operator. That is, the CN aggregator aggregates the core facing interfaces of the SNs to a single interface towards the EPC 380. It also provides a single Iuh connection between the SNs and the core network, specifically the mobile switching center (MSC) 390 for circuit-switched calls and the serving GPRS support node (SGSN) 390 for packet-switched calls. In particular, for UMTS networks the CN aggregator connects to a Home Node B Gateway (HNBGW) using Iuh/S CTP protocols. It can also connect to a pool of LTE MMEs using S1AP/SCTP protocols by providing one S1AP/SCTP connection to each MME. The MMEs to which it connects may belong to a single operator or multiple operators. The CN aggregator can connect to each individual SN using an S1AP/SCTP interface for LTE and an Iuh/SCTP interface for UMTS. The CN aggregator can also support Iu-Flex and S1-flex features and provide optimization for local area code (LAC)/routing area code (RAC) and tracking area code (TAC) planning and for paging.

The mobility anchor in the CN aggregator and mobility anchor module 330 hides from the core network all mobility events between the RN clusters and mobility events between SNs. All data plane traffic for LTE and UMTS terminate at the mobility anchor. The mobility anchor also provides soft handover functionality between RN clusters and manages PSC/PCI hand-in disambiguation across RN clusters when UEs move from the macro network to the small cell network and need to be assigned to an RN cluster. The mobility anchor can also provide GTP anchoring between the RNs and the EPC.

As noted above, the individual SNs each include Self-Organizing Network (SON) functionality, which facilitates automation of self-configuration, self-management, self-optimization and self-healing of the individual RN clusters. SON is an automation technology designed to make the planning, configuration, management, optimization and healing of mobile radio access networks simpler and faster. SON functionality and behavior has been defined and specified in generally accepted mobile industry recommendations produced by organizations such as 3GPP (3rd Generation Partnership Project) and the NGMN (Next Generation Mobile Networks). SON features are available for both LTE and UMTS. Typically, each SN 310 operates in a distributed SON (D-SON) architecture mode. Thus, the SN 310 configures and optimizes the cluster with which it is associated. When a new RN is added, it discovers the SN. From that point on, the SN takes responsibility for providing the RN with its software image and radio configuration. If an RN inside the cluster drops off the network, the SN servicing it adjusts the configuration of neighboring RNs to fill the coverage hole.

The A-SON module 340 shown in FIG. 3 is used to coordinate the actions of the various D-SON elements in each of the SNs 310 using a hierarchical structure to ensure that there is seamless SON functionality across the SNs. Using only limited topology information, the A-SON module 340 can group RNs into RN clusters and identify which clusters can undergo distributed SON simultaneously. In particular, the A-SON module 340 can solve a number of problems related to the discovery and management of the network topology for clusters of small cells. The problems that are addressed include: (1) how to accurately build network topology information for the boundary cells of each cluster, which see not only overlay macro cells but also boundary cells of other clusters that are deployed in the proximity and (2) how to update the network topology when some cells change their configurable parameters.

The A-SON module 340 can perform a variety of tasks. For instance, it can allocate physical cell identifiers (PCI) and primary scrambling codes (PSC) and their reuse across RN clusters associated with different SNs. The A-SON module 340 can also dynamically allocate transmit power assignments of radio nodes, perform closed loop monitoring of inter-SN mobility KPIs, dynamically update the neighbor topology and the neighbor tables maintained by the SNs and detect RF coverage overlaps and holes between cells. Mobility Robustness Optimization (MRO) and Mobility Load Balancing (MLB) may also be performed by the A-SON module 340.

The individual D-SON elements in the RN clusters cooperate with the A-SON module 340 to perform a number of tasks, including coordinating the SON configurations as received from A-SON module 340, providing periodic measurements and KPIs to the A-SON module, and dynamic fractional frequency reuse (FFR) assignments within the SNs, which may be based, for example, on the number of cell edge users and cell center users in the RNs served by the respective SNs at any given time. The D-SON elements also perform over the air frequency and phase synchronization of the RNs with other RNs and macro cells, when possible.

As further shown in FIG. 3, a management interface 370 to the gateway 300 may be provided which allows network operators to manage multiple small cell systems. The management interface is a centralized configuration, fault, and performance management system. Communication between the management interface 370 and the gateway 300 may be accomplished using, for example, a TR-69 or SNMP connection.

In some implementations the gateway 300 may operate as a multimode gateway supporting two or more bands. For example, one band may operate in accordance with LTE standards and the other may operate in accordance with UMTS standards. Accordingly, the gateway 300 can support clusters in which independent LTE and UMTS small cells are co-located, each being served by a dual or multi-mode RN.

A multimode gateway may be employed in a variety of different circumstances. For instance, a network operator may deploy the system and reserve one of the bands for themselves and lease the other band to another network operator. Alternatively, a third party may own and deploy the multimode network. In either case, each network operator wants to use their own core network. In such a case the CN aggregator may have multiple S1 connections to the different core networks of the operators. Additionally, each dual (or multi) mode RN may have two (or multi) dedicated proprietary X1 connections to the SNs, each representing a different operator. From the operators' perspective, there appears to be a SN and a set of RNs dedicated to each operator, although the different SNs may reside on a common hardware platform. To provide this capability the SNs are provided with functionality that allows each operator to configure their cells independently of the other.

In some cases the multimode gateway can facilitate cooperation among the different network operators. The different operators would be aware of the shared resources (e.g., RNs and all or various subcomponents of a SN) and would allow information to be shared between them in order to allow joint optimization of the coverage and capacity for UEs supported by the different operators.

Figure 5:
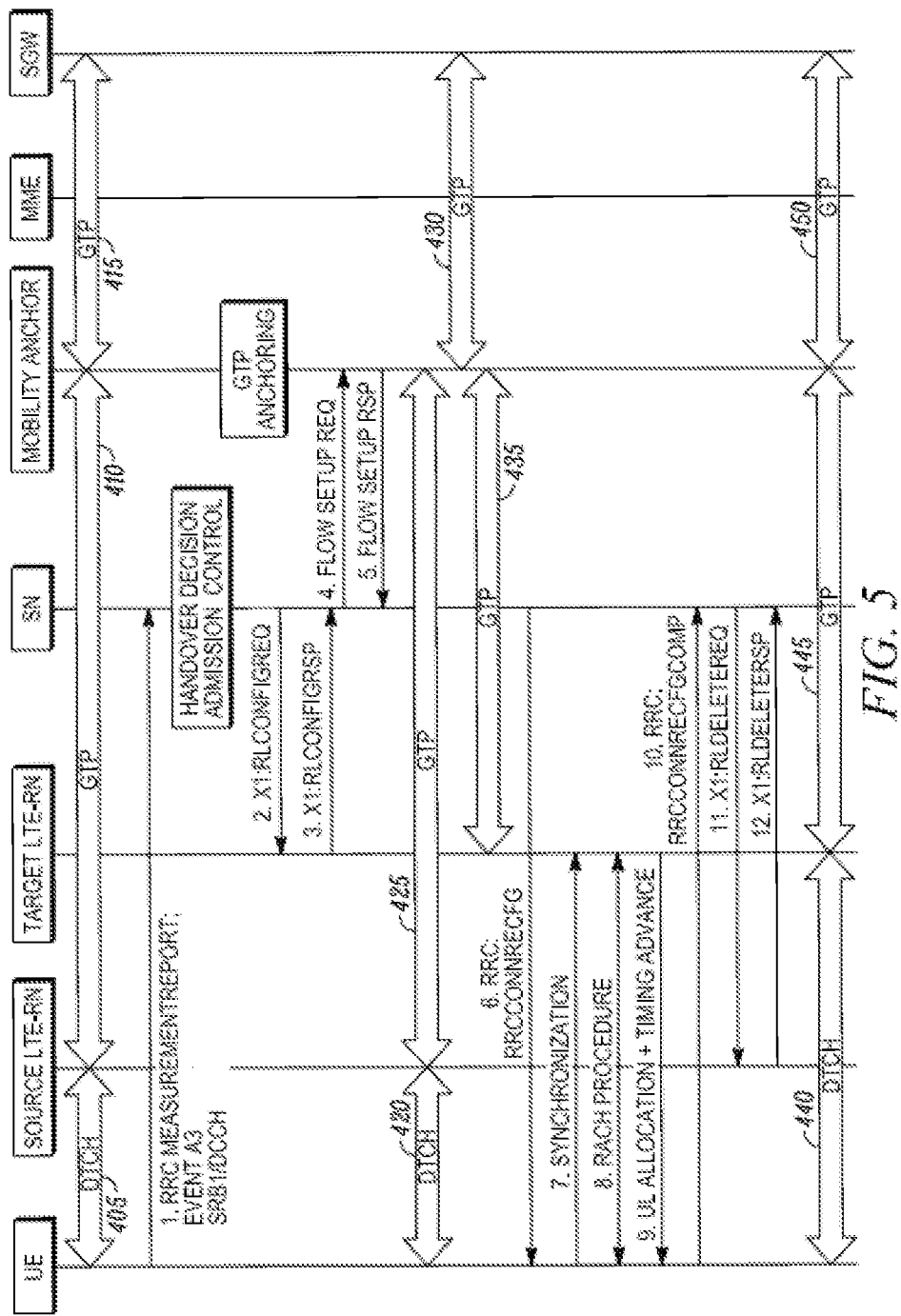
FIG. 5 shows a message flow diagram of an LTE intra-SN handover in which a UE connected to a source RN is handed-over by the gateway shown in FIG. 3 to a new RN (the target RN).

FIG. 5 shows a message flow diagram of an LTE intra-SN handover in which a UE connected to a source RN is handed-over by the gateway to a new RN (the target RN). Initially, the UE is connected to the source RN over a logical dedicated transport channel (DTCH), indicated by arrow 405, which is used to carry all traffic between a UE and an RN. The source RN, in turn, uses the GPRS tunneling protocol (GTP), indicated by arrow 410, to carry uplink user traffic and transport it from the Source RN to the mobility anchor in the CN aggregator and mobility anchor. Likewise, the mobility anchor, which aggregates all GTP traffic received from, and destined for, the various RNs, forwards the uplink user traffic, indicated by arrow 415, to the SGW in the core network using GTP. Similarly, downlink user traffic is received by the mobility anchor from the SGW and establishes a new GTP tunnel over which the traffic is forwarded to the source RN, which in turn forwards the traffic to the UE over the DTCH.

With continuing reference to FIG. 5, the source RN receives at 1 a Radio Resource Control (RRC) measurement report. There are multiple measurement report triggering events defined for an LTE cellular network. When the criteria or conditions defined for a triggering event are satisfied, the UE will generate and send a measurement report to its serving cell RN. In this case the UE sends a measurement report upon the occurrence of an A3 event, which indicates that the UE is receiving a stronger signal from a neighboring cell than the current serving cell. That is, in this case the RRC measurement report indicates that the UE is receiving a stronger signal from the target RN than the source RN. The source RN forwards the RRC measurement report to the SN with which it is associated.

Based on the measurement report, the SN decides to perform a handover from the source RN to the target RN. In this example both the source and target RNs are associated with the same SN instance. In response, at 2, the SN uses the UE context information to set up a radio link between the SN and target RN using the X1 interface by sending a radio link configuration request. At 3, the target RN responds with a radio link configuration response. In this way the target RN is prepared by the SN for the handover of the UE. After the target RN has been prepared, the SN sends a flow setup request at 4 to the mobility anchor. In this way the SN interacts with the mobility anchor to establish a new GTP tunnel between the target RN and mobility anchor. The mobility anchor responds with a flow setup response at 5.

At this point all GTP information has been exchanged that is needed to set up a tunnel between the mobility anchor and the target RN, but no traffic is being communicated on that tunnel yet. That is, as indicated by arrows 420, 425 and 430, all user traffic is still going through the source RN. Next, as indicated by arrow 435, GTP traffic also starts flowing from the mobility anchor to the target RN as well as source RN. Subsequently, the mobility anchor stops sending GTP traffic to the source RN. Thus, all downlink data destined for the UE now comes from the SGW to the mobility anchor, and then to the target RN, which at this point is simply buffering the traffic. All uplink traffic, however, is still going through the source RN, to the mobility anchor and then to the SGW.

Next, at 6 the SN sends a RRC connect reconfiguration request to the UE instructing it to switch to the target RN. At 7-9, a conventional exchange of messages occurs between the UE and the target RN to synchronize the UE and the target RN. For instance, the UE undergoes at 8 a Random Access Channel (RACH) procedure over a logical RACH channel in order to attach to the target RN. Likewise, at 9 the target RN responds with the UL allocation and timing advance information.

At this point the UE is now synchronized with the target RN and at 10 the UE sends a RRC connection reconfiguration complete message to the SN. From a layer 3 signaling point of view, the handover is now complete. Finally, at 11 the SN uses the X1 interface to send a radio link delete request to the source RN and at 12 the source RN acknowledges by sending the SN a radio link delete response. The target RN now sends the buffered user traffic to UE over the DTCH, as indicated by arrow 440. Accordingly, uplink and downlink traffic can now be communicated between the UE and target RN using DTCH and between the target RN and mobility anchor using GTP (arrow 445), as well as between the mobility anchor and the SGW using GTP (arrow 450).

As the message flow chart in FIG. 5 illustrates, an intra-SN UE handover can be performed in a manner that is transparent to the core network since all mobility-related messages terminate at the mobility anchor.

Figure 6:
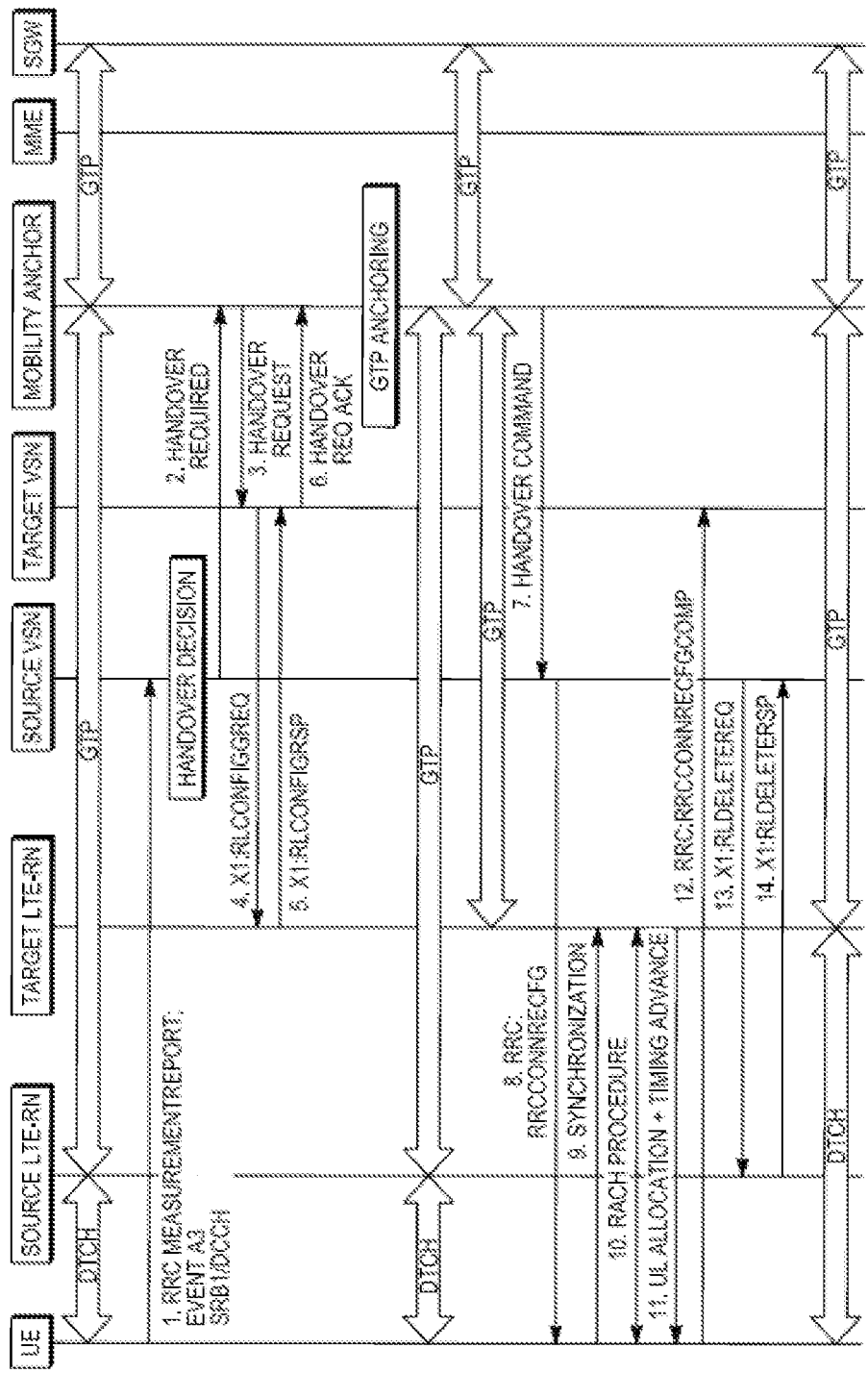
FIG. 6 shows a message flow diagram of an LTE inter-SN handover in which a UE connected to a source RN associated with one SN instance is handed-over to a new RN (the target RN) that is associated with a different SN instance in the gateway of FIG. 3.

Similar to FIG. 5, FIG. 6 shows a message flow diagram of an LTE inter-SN handover in which a UE connected to a source RN associated with one SN instance is handed-over to a new RN (the target RN) that is associated with a different SN instance in the gateway.

The primary difference between the messages that are exchanged in the inter-SN handover of FIG. 5 compared to the intra-SN handover of FIG. 6 is that in FIG. 6 the layer 3 context is moved from one SN instance to another SN instance. This occurs when the source SN determines that the target RN is associated with a different SN. Unlike in FIG. 5, this transfer between SN instances requires communication between the source and target SN instances via the mobility anchor.

In the following only those messages that are different from those shown in FIG. 5 are discussed. As in FIG. 5, the UE is initially attached to the source RN, which is associated with the source SN.

As shown in FIG. 6, after the source SN decides to perform a handover from the source RN to the target RN, the source RN sends a handover request at 2 to the mobility anchor. In response, at 3 the mobility anchor sends a handover request to the target SN, identifying to it the source SN, the source RN, and the UE. When the target SN receives the handover request at 3, it prepares the radio link as it did before at 4-5. After the radio link has been successfully configured, at 6 the target SN acknowledges the handover by sending handover request acknowledgement to the mobility anchor, indicating that it is ready for UE attachment. The mobility anchor then sets up a GTP tunnel between it and the target RN. At 7 the mobility anchor sends a handover command to the source SN indicating that the request has been fulfilled. As before, the source SN sends the UE at 8 an RRC connect reconfiguration, which contains the information it needs concerning the target RN. The remaining synchronization and other message exchanges proceed as in FIG. 5.

Topology Discovery and Management and SON Orchestration

As noted above, the cluster manager/OAM module 320 selects the SN instance that is to serve a particular RN based on a variety of factors ("signatures") that may include, without limitation, the geographic location of the RN, e.g., GPS coordinates, physical address, RF topology, and IP address. The results of the topology discovery process performed by the A-SON module 340 and load balancing considerations are based on the current load of the SNs. Accordingly, topology discovery can include different pieces of information from the RNs, including, e.g., GPS coordinates, physical address, RF topology determined through REM scan, IP Address etc. Self configuration can involve detecting neighbor relations, PSC/PCI assignment, RACH Root Sequence assignment, transmit power assignment etc.

Figure 7:
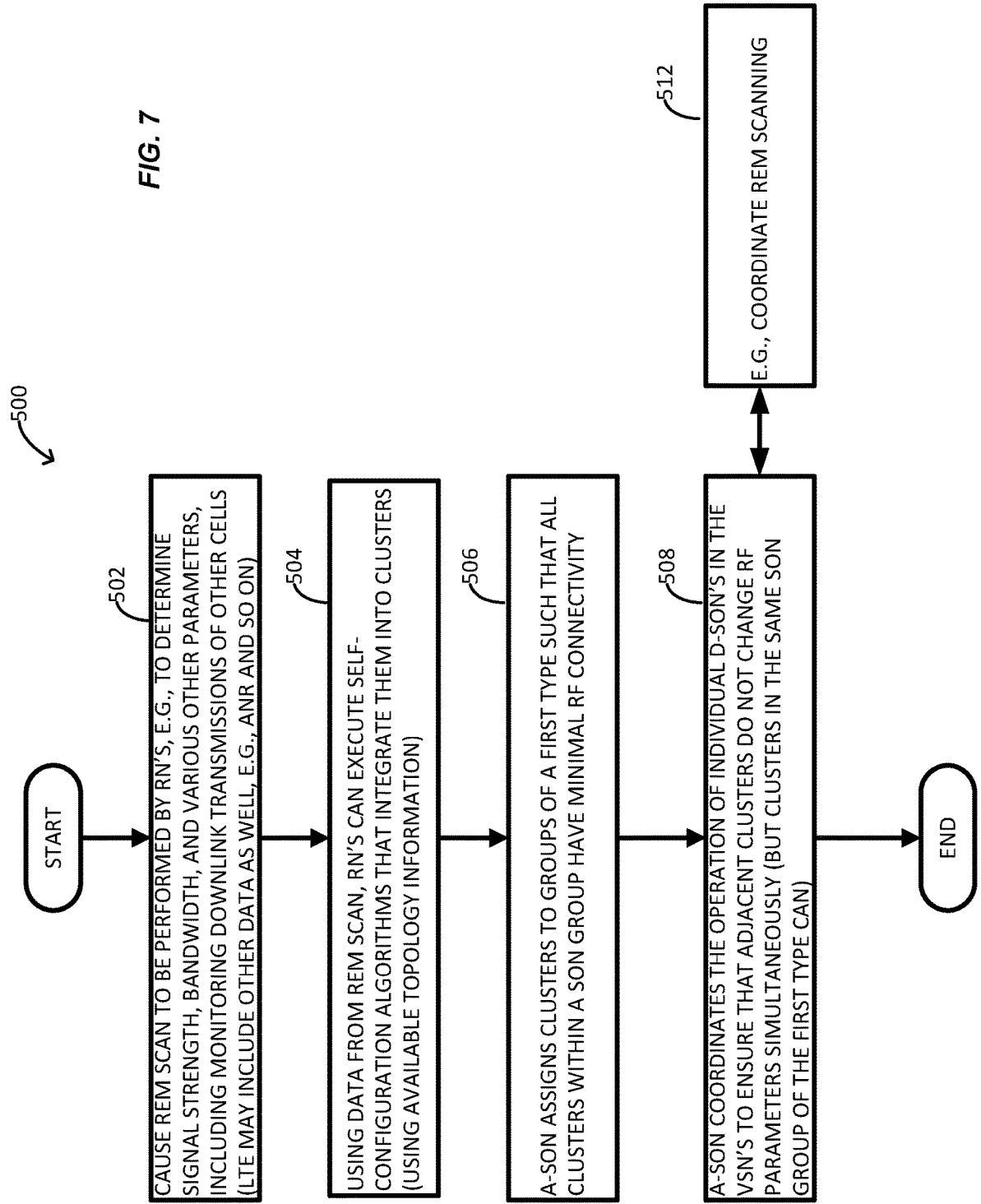
FIG. 7 is a flowchart illustrating a method according to present principles.

In more detail, SON functionality includes self-configuration processes and as part of these processes the D-SON functionality provided in the individual access controllers, e.g., hosted on a virtual machine, is responsible for causing a "sniffing" process to be performed. This sniffing process, which is otherwise known as a radio environment measurement (REM) scan, is illustrated in the flowchart 500 of FIG. 7. In such processes (step 502), information can be measured such as signal strength, bandwidth, as well as various other parameters such as the PSC cell identity (in UMTS systems) and the PCI (physical cell identity) (in LTE systems) and global cell identifiers. These measurements are performed by the individual RNs, which monitor the downlink transmissions of other cells.

In LTE systems the RNs may use an Automatic Neighbor Relations (ANR) function to identify and collect additional information about neighboring cells and set up a Neighbor Relation Table (NRT), which can facilitate faster cell handovers by UEs. The additional information can be obtained from UE measurement reports of the RF environment.

From the various data that is collected, the RNs can execute various self-configuration algorithms (step 504) that integrate them into clusters without interference from neighboring cells. Examples of self configuration algorithms include, e.g., PSC/PCI assignment, RACH Root Sequence assignment, transmit power assignment, and so on.

Because RN clusters may be in close proximity to one another, the automatic configuration and optimization of RF parameters such as PCI/RS assignment, transmit power assignment, and ICIC/FFR configuration using SON, is important. D-SON algorithms such as those employed in the VSNs assume that the configuration of the surrounding macro and small cell systems remain constant. However, a parameter change in one cell can cause the SON algorithm used by a neighboring cluster to react to the parameter change in a way that negatively impacts performance. Other problems also inure to such arrangements.

While C-SON algorithms can address these problems to some extent, they require a central entity that has complete knowledge of all the RF parameters in the system. Accordingly, these shortcomings of SON are sometimes currently addressed by manual parameter tuning at the boundary of two clusters (or at the boundary between a cluster and a macro cell).

As an alternative to the use of manual tuning or C-SON techniques, the A-SON module in the virtualized gateway can coordinate distributed SON optimizations without the need for a central entity such as used in C-SON, which as noted above needs complete information about all the RF parameters in the system. That is, the A-SON can perform steps 502-504 in a coordinated way, accomplishing the same goals as manual efforts but in a coordinated and automatic way.

In one implementation after standard clustering algorithms are used to group small cells into clusters using available topology information, as described above, the A-SON can assign the clusters to SON groups of a first type such that all clusters within a SON group have minimal RF connectivity (step 506). Two RNs would have minimal RF connectivity if a UE at the edge of one RN cannot detect the second RN. In more detail, if the maximum path loss at which the downlink channels are reliably detected by a device is denoted by D_max dB, then minimal RF connectivity for two RNs would typically require a separation between the RNs corresponding to around D_max+20 dB. For small cells with 21 dBm maximum transmit power, D_max is around 115 dB and thus minimal RF connectivity corresponds to path loss of at least 135 dB between two RNs.

Figure 8:
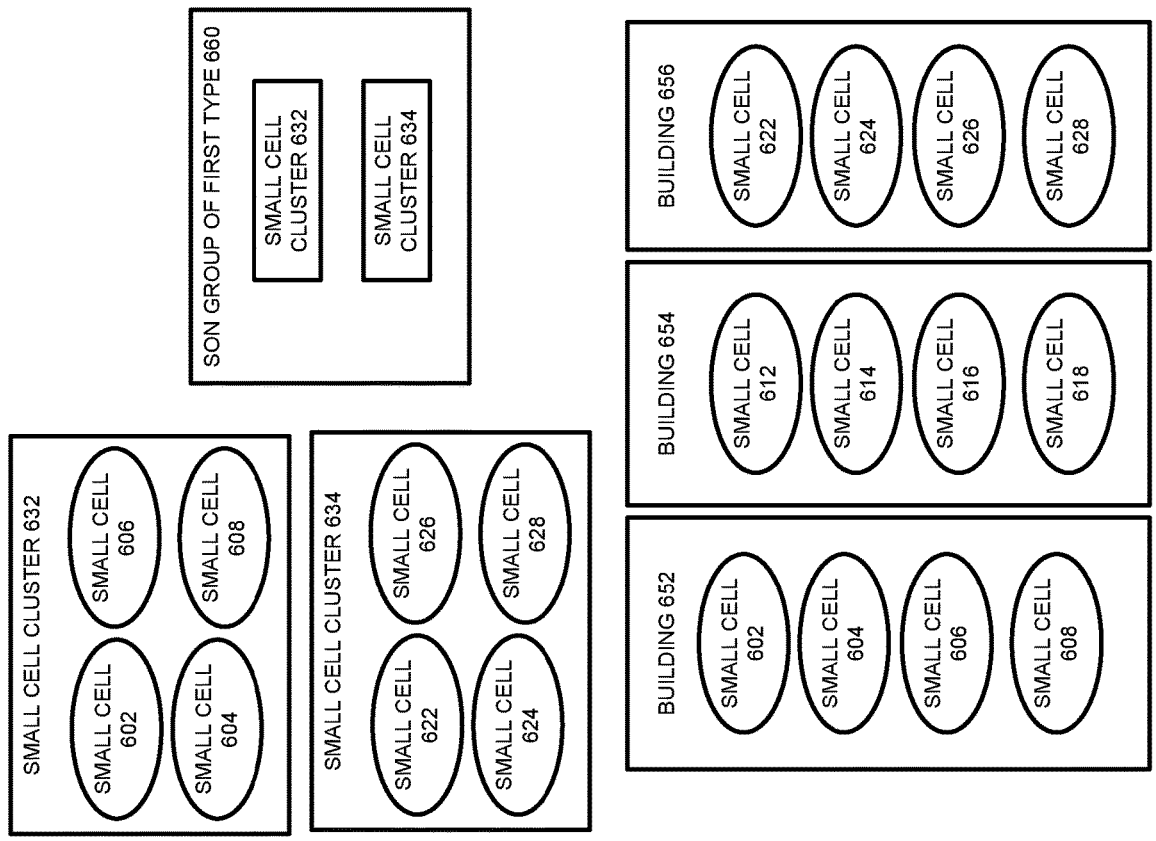
FIG. 8 is a schematic diagram showing small cell clusters and SON groups of a first type.

This situation is also shown in FIG. 8, in which buildings 652, 654, and 656 each have a number of small cells within them. Building 652 includes small cells 602, 604, 606, and 608. Building 654 includes small cells 612, 614, 616, and 618. Building 656 includes small cell 622, 624, 626, and 628. Small cell clusters 632 and 634 are shown. Each of these clusters corresponds to a cluster within a particular building, to wit, buildings 652 and 656, respectively. However, a SON group defined and arranged of the first type, shown as SON group 660, includes small cell clusters 632 and 634, which correspond to nonadjacent buildings and thus here are assumed to have minimal or no RF connectivity.

For instance, while a single cluster may include cells in a particular building (or on the same floor of a particular building), a SON group of the first type may contain clusters in non-adjacent buildings (e.g., buildings 652 and 656). The A-SON then coordinates the operation of the individual D-SONs in the VSNs to ensure that adjacent clusters do not change RF parameters simultaneously. To accomplish this, the A-SON can coordinate with the VSNs to ensure that neighboring clusters do not perform a REM scan at the same time. In particular, the A-SON may coordinate the REM scanning (step 512) of the boundary cells in each cluster such that they do not perform simultaneous scans (step 508). This coordination can be performed using, for example, a conflict graph. If building 654 is associated with its own cluster (not shown), then the cluster of building 654 may be coordinated to not perform REM scans at the same time as small cell clusters 632 or 634. The cluster of building 654 may be further coordinated and managed such that it does not change RF parameters at the same time as that of small cell clusters 632 or 634.

However, to speed up the optimization process, the A-SON can allow clusters in the same SON group of the first type to simultaneously update RF parameters (step 508) since in this case the inter-cluster RF connectivity is low. For example, small cell clusters 632 and 634 may be allowed to simultaneously update RF parameters. In the, by use of such SON groups of the first type, parameter updating, REM scans, and the like, can be effectively optimized.

This arrangement leads to numerous benefits, primarily addressed to the problem of how to accurately build network topology information for the boundary cells of each cluster, which see not only overlay macro cells but also boundary cells of other clusters that are deployed in the proximity.

Figure 9:
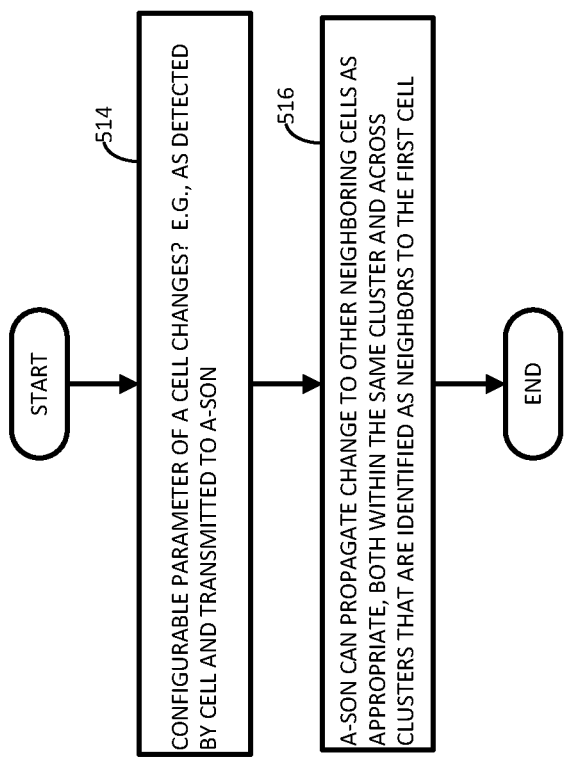
FIG. 9 is a flowchart illustrating a further method according to present principles.

Another benefit concerns the updating of network topology when some cells change one or more configurable parameters. For example, and referring to FIG. 9, when a configurable parameter of a cell in any cluster that is serviced by the A-SON changes (step 514), the A-SON can propagate the new parameter proactively to all the neighboring cells (step 516), both within the same cluster and across clusters that are identified as neighbors to the first cell. Examples of such configurable parameters include PSC/PCI and RACH Root Sequence.

Figure 10:
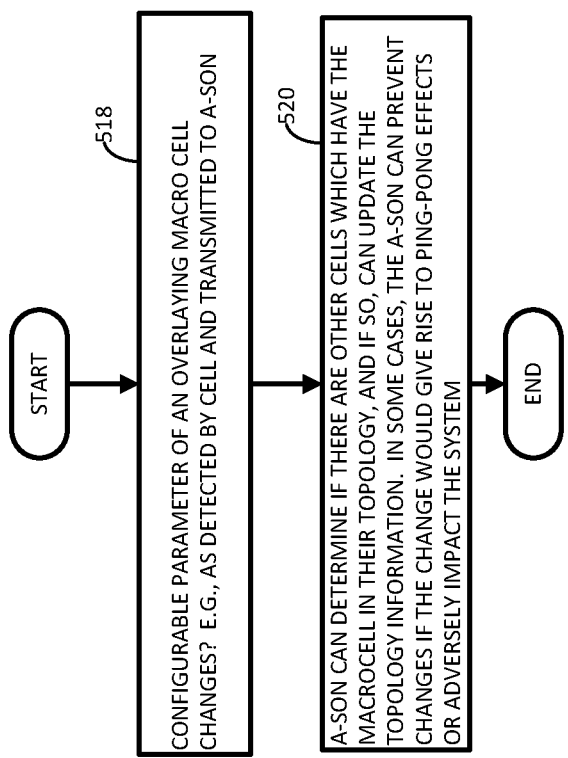
FIG. 10 is a flowchart illustrating yet a further method according to present principles.

As another example, and referring to FIG. 10, if one or more configurable parameters of the overlay macro cell changes (step 518), such a change may generally be first detected by one of the small cells that is in a cluster serviced by the A-SON. Then, the A-SON can determine if there are other cells which also have the macro cell (with the parameter change) in their topology. If so, the A-SON can update the topology information (step 520). Examples of such configurable parameters are as noted above, e.g., PSC/PCI assignment. During REM scan, a small cell would detect the PSC/PCI of a macro cell.

In some embodiments the A-SON may prevent or suppress potential changes to one or more parameters in a cluster if the change would give rise to a ping-pong effect or would otherwise adversely impact the overall system optimization.

Figure 11:
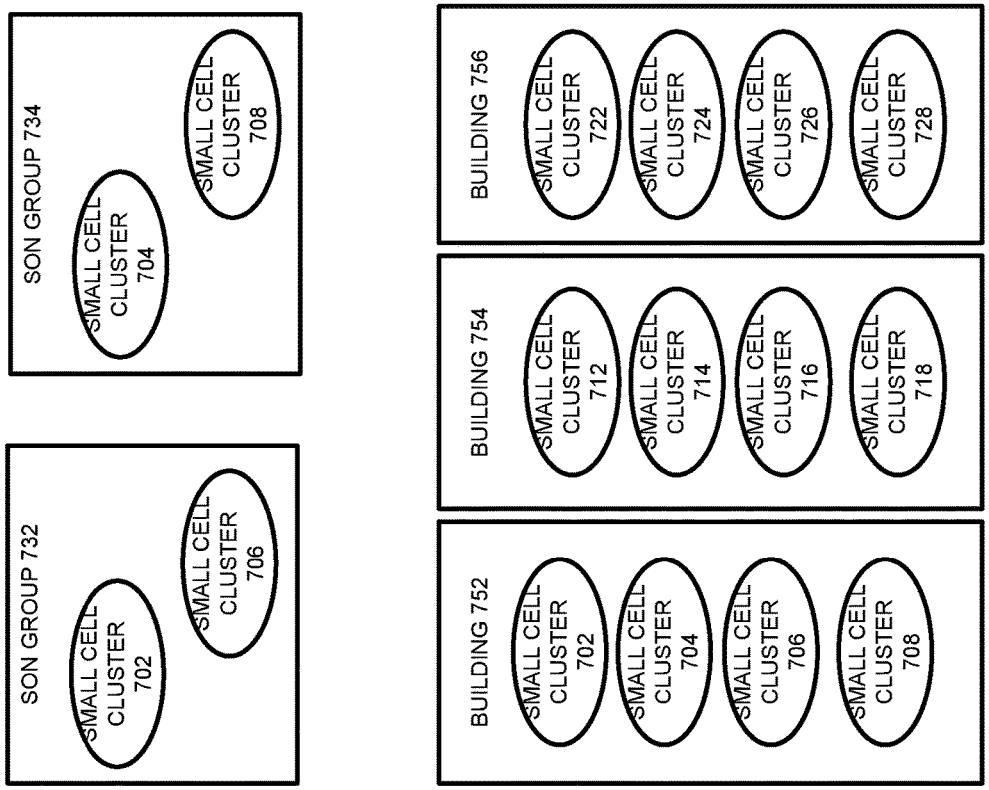
FIG. 11 is a schematic diagram showing small cell clusters and SON groups of a second type.
Figure 12:
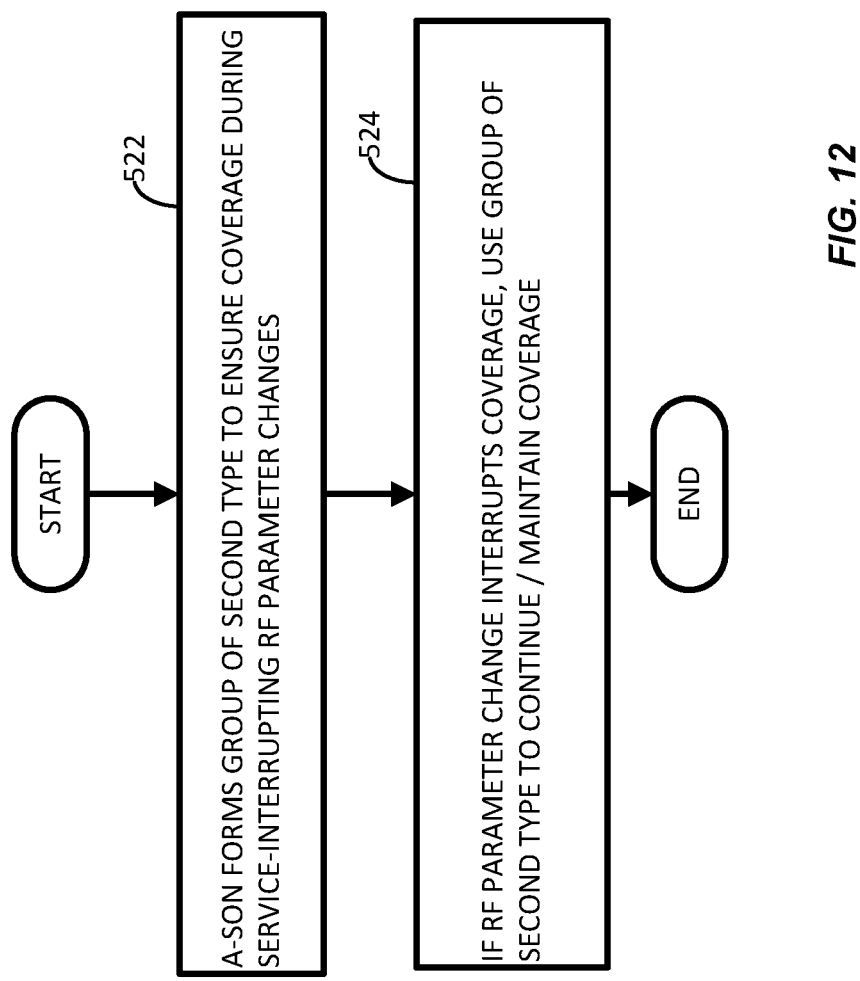
FIG. 12 is a flowchart illustrating yet a further method according to present principles.

As yet another example, and referring to FIGS. 11 and 12, in some embodiments the A-SON may also be used to ensure that sufficient coverage is maintained during service-interrupting RF parameter changes.

In FIG. 11, buildings 752, 754, and 756 each have a number of small cells grouped into clusters within them. Building 752 includes small cell clusters 702, 704, 706, and 708. Building 754 includes small cell clusters 712, 714, 716, and 718. Building 756 includes small cell clusters 722, 724, 726, and 728. As indicated, these clusters of small cells are situated on different floors of the buildings.

SON groups of a second type of small cell clusters 732 and 734 are shown. Each of these groups corresponds to a group of clusters within a particular building, to wit, building 752. In particular, they correspond to clusters on alternating floors within a single building.

That is, in this case, the A-SON could form the second type of SON group from clusters of small cells (step 522), located on alternating floors of an office building. In the case of a service interrupting parameter change, such cells may be relied on, i.e., the cells on the remaining floors, to provide coverage during the interruption (step 524).

SON clusters of the second group would be a subset of all clusters within a geographic area, e.g., a building, that could provide reasonable service if all remaining clusters in that area cease service. Thus, SON clusters of the second group generally need to be close enough to the service-interrupted clusters.

Another set of useful SON groups could include cells that are at the 'edge' of a building. Complementary to that group would be cells in the 'interior' of the building. Edge group cells would handle handovers to/from the macro so or other small cells and might have different parameter configurations compared to cells in interior group.

Likewise, the A-SON may be used to stage system-wide configuration changes by only upgrading or modifying the configuration in isolated small cell clusters (the aforementioned first type of SON groups) for which RF interaction is minimal. Exemplary configuration changes include, e.g., PSC/PCI, RACH Root Sequence, and so on.

Figure 13:
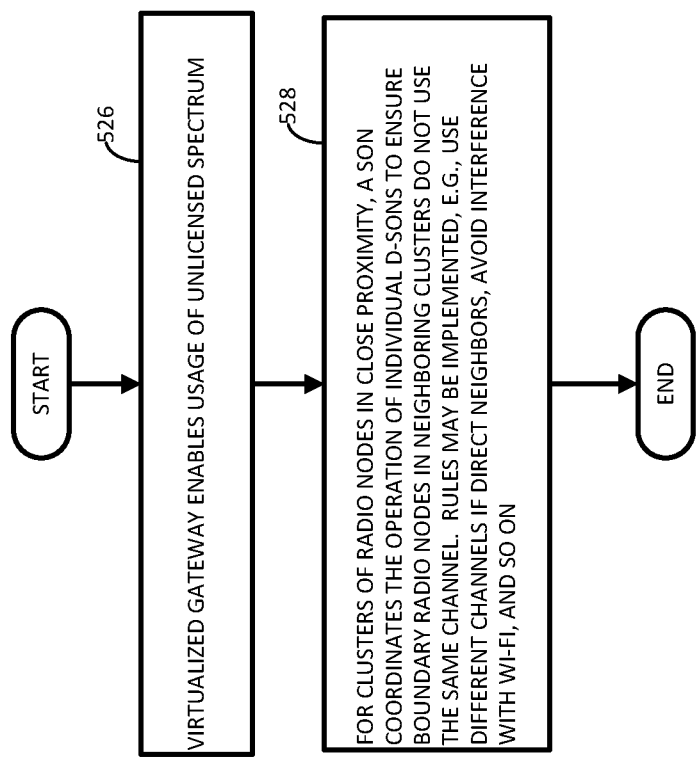
FIG. 13 is a flowchart illustrating yet a further method according to present principles.

In yet another example of use, and referring to FIG. 13, in some cases the virtualized gateway may be used with an LTE-LAA communication system that operates with unlicensed spectrum. Due to the abundance of spectrum resources in the unlicensed band, each LTE-LAA enabled RN can select an unlicensed carrier channel for its operation in addition to the licensed carrier channel (step 526). For clusters of radio nodes that are in close proximity, boundary nodes need to coordinate the selection of channels to avoid creating mutual interference. This can be accomplished by the A-SON, which can coordinate (step 528) the operation of the individual D-SONs in the VSNs to ensure boundary RNs in neighboring clusters do not use the same channel if, for example, they are direct neighbors of each other. Of course, other channel selection criteria may be used by the A-SON to prevent certain RNs from using certain unlicensed channels. For example, such criteria may be used so as to prevent interference with Wi-Fi channels.

It is noted here that, to avoid PSC/PCI ambiguity during handovers, they should be assigned such that there is no reuse of PSC/PCI not just among first-tier neighbors but also among second tier neighbors. Other parameters like RACH Root Sequence need to be unique only among first tier neighbors.

Accordingly, with only limited topology information, the A-SON can group small cells into RN clusters and identify which clusters can undergo distributed SON simultaneously. In particular, the A-SON can solve a number of problems related to the discovery and management of the network topology for clusters of small cells.

Several aspects of telecommunication systems will now be presented with reference to virtualized gateway described in the foregoing detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionalities described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable media. Computer-readable media may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable media for storing or transmitting software. The computer-readable media may be resident in the processing system, external to the processing system, or distributed across multiple entities including the processing system. Computer-readable media may be embodied in a computer-program product. By way of example, a computer-program product may include one or more computer-readable media in packaging materials. Those skilled in the art will recognize how best to implement the described functionality presented throughout this disclosure depending on the particular application and the overall design constraints imposed on the overall system.

The invention claimed is:

1. A gateway through which a plurality of radio access networks (RANs) communicate with a packet core network, comprising:
   a plurality of access controller circuits to which at least one RAN is assigned, each of the plurality of access controller circuits being configured to control the at least one RAN assigned thereto;
   a core network aggregator circuit configured as a single interface for all communication between the plurality of access controller circuits and the packet core network; and
   a cluster manager circuit configured to:
      assign radio nodes (RNs) to the plurality of access controller circuits;
      transfer RN assignments from one access controller circuit to a different access controller circuit under specified circumstances;
      assign a subset of clusters to groups of a first type, such that clusters within a group of the first type have minimal radio frequency (RF) connectivity; and
      coordinate scanning or updating of RF parameters such that adjacent clusters do not scan or update simultaneously but clusters within the groups of the first type do have at least partially overlapping scans or updates.

2. The gateway of claim 1, wherein the cluster manager circuit is further configured to assign a subset of clusters to first and second groups of a second type, such that clusters within the first group of the second type have coverage to provide RF connectivity to clusters within the second group, if the second group encounters a service interruption.

3. The gateway of claim 2, wherein the cluster manager circuit is further configured to cause a plurality of radio nodes associated with respective small cells to select a plurality of respective unlicensed carrier channels for their operation in addition to licensed carrier channels.

4. The gateway of claim 3, wherein the cluster manager circuit is further configured to coordinate the selection of the plurality of respective unlicensed carrier channels to ensure that boundary small cells in neighboring clusters do not use a same channel.

5. The gateway of claim 2, wherein the minimal RF connectivity corresponds to a situation such that a user equipment (UE) at an edge of one radio node cannot detect a second radio node.

6. The gateway of claim 1, wherein the cluster manager circuit is further configured to cause a plurality of radio nodes associated with respective small cells to select a plurality of respective unlicensed carrier channels for their operation in addition to licensed carrier channels.

7. The gateway of claim 6, wherein the cluster manager circuit is further configured to coordinate the selection of the plurality of respective unlicensed carrier channels to ensure that boundary small cells in neighboring clusters do not use a same channel.

8. The gateway of claim 7, wherein the minimal RF connectivity corresponds to a situation such that a user equipment (UE) at an edge of one radio node cannot detect a second radio node.

9. The gateway of claim 6, wherein the minimal RF connectivity corresponds to a situation such that a user equipment (UE) at an edge of one radio node cannot detect a second radio node.

10. The gateway of claim 1, wherein the minimal RF connectivity corresponds to a situation such that a user equipment (UE) at an edge of one radio node cannot detect a second radio node.

11. A gateway through which a plurality of radio access networks (RANs) communicate with a packet core network, comprising:
   a plurality of access controller circuits to which at least one RAN is assigned, each of the plurality of access controller circuits being configured to control the at least one RAN assigned thereto;
   a core network aggregator circuit configured as a single interface for all communication between the plurality of access controller circuits and the packet core network; and
   a cluster manager circuit configured to:
      assign radio nodes (RNs) to the plurality of access controller circuits;
      transfer RN assignments from one access controller circuit to a different access controller circuit under specified circumstances;
      assign a subset of clusters to groups of a first type, such that clusters within a group of the first type have minimal radio frequency (RF) connectivity;
      coordinate scanning or updating of RF parameters such that clusters within the groups of the first type have at least partially overlapping scans or updates; and
      assign a subset of clusters to first and second groups of a second type, such that clusters within the first group of the second type have coverage to provide RF connectivity to clusters within the second group, if the second group encounters a service interruption.

12. The gateway of claim 11, wherein the cluster manager circuit is further configured to cause a plurality of radio nodes associated with respective small cells to select a plurality of respective unlicensed carrier channels for their operation in addition to licensed carrier channels.

13. The gateway of claim 12, wherein the cluster manager circuit is further configured to coordinate the selection of the plurality of respective unlicensed carrier channels to ensure that boundary small cells in neighboring clusters do not use a same channel.

14. The gateway of claim 13, wherein the minimal RF connectivity corresponds to a situation such that a user equipment (UE) at an edge of one radio node cannot detect a second radio node.

15. The gateway of claim 12, wherein the minimal RF connectivity corresponds to a situation such that a user equipment (UE) at an edge of one radio node cannot detect a second radio node.

16. The gateway of claim 11, wherein the minimal RF connectivity corresponds to a situation such that a user equipment (UE) at an edge of one radio node cannot detect a second radio node.

* * * * *